US006556230B2

(12) United States Patent
Fukui et al.

(10) Patent No.: US 6,556,230 B2

(45) Date of Patent: Apr. 29, 2003

(54) HEAT MELTABLE INK IMAGE-RECEIVING SHEET AND IMAGE FORMING METHOD USING THE SAME

(75) Inventors: Takuto Fukui, Osaka-fu (JP); Zheng Long Cai, Osaka-fu (JP); Toshiyuki Yamane, Osaka-fu (JP); Fumiaki Shinozaki, Osaka-fu (JP)

(73) Assignee: Fujicopian Co., Ltd., Osaka-Fu (JP)

( * ) Notice: Subject to any disclaimer, the term of this patent is extended or adjusted under 35 U.S.C. 154(b) by 0 days.

(21) Appl. No.: 09/952,219

(22) Filed: Sep. 13, 2001

(65) Prior Publication Data

US 2002/0060729 A1 May 23, 2002

(30) Foreign Application Priority Data

Sep. 14, 2000 (JP) ....................................... 2000-280704

(51) Int. Cl.[7] ................................................ G01D 15/10

(52) U.S. Cl. ....................................................... 347/171

(58) Field of Search ................................ 347/171, 172, 347/221, 213, 217, 211, 206, 199, 183; 428/195, 537.5, 206, 207, 321.3, 913.3; 427/208.2; 503/227; 156/235; 400/241, 241.1

(56) References Cited

U.S. PATENT DOCUMENTS

| | | | | | |
|---|---|---|---|---|---|
| 5,468,564 | A | * | 11/1995 | Ohtani et al. | 428/195 |
| 5,521,626 | A | | 5/1996 | Tanaka et al. | 347/183 |
| 5,538,577 | A | | 7/1996 | Negoro | 156/235 |
| 5,569,347 | A | * | 10/1996 | Obata et al. | 156/230 |
| 5,597,641 | A | | 1/1997 | Suematsu et al. | 428/195 |
| 5,773,128 | A | | 6/1998 | Obata et al. | 428/195 |
| 6,133,929 | A | | 10/2000 | Negoro et al. | 347/171 |
| 6,165,938 | A | * | 12/2000 | Narita et al. | 428/913 |
| 6,171,648 | B1 | * | 1/2001 | Himmelsbach et al. | 427/208.2 |

FOREIGN PATENT DOCUMENTS

| | | |
|---|---|---|
| JP | 07-179053 A | 6/1995 |
| JP | 08-090928 | 4/1996 |
| JP | 2001096932 | 4/2001 |

* cited by examiner

*Primary Examiner*—John S. Hilten
*Assistant Examiner*—K. Feggins
(74) *Attorney, Agent, or Firm*—Fish & Neave

(57) ABSTRACT

A heat meltable ink image-receiving sheet used in a melting type thermal transfer method, comprising a sheet substrate and a porous ink-receiving layer, comprising a resin formed on at least one side of the sheet substrate, the porous ink-receiving layer having a thickness of 3 to 50 $\mu$m and a water vapor permeability (JIS L 1099) of not less than 300 g/(m$^2$·hour) and less than 1,000 g/(m$^2$·hour).

8 Claims, No Drawings

HEAT MELTABLE INK IMAGE-RECEIVING SHEET AND IMAGE FORMING METHOD USING THE SAME

BACKGROUND OF THE INVENTION

The present invention relates to a heat meltable ink image-receiving sheet used in an image forming method wherein a thermal transfer sheet with a heat meltable ink on a substrate is brought into contact with an ink-receiving layer of the image-receiving sheet so as to face the ink side of the thermal transfer sheet, and the ink is melted with heat from a printing head of a thermal transfer printer from the back side of the thermal transfer sheet and penetrated into pores of the ink-receiving layer. The present invention also relates to an image forming method using the image-receiving sheet.

In forming a high-definition image using a thermal transfer printer, it was known to form a color image wherein using an image-receiving sheet with a porous ink-receiving layer and to perform a melting transfer from thermal transfer sheets in yellow, magenta and cyan (black etc. if required) by penetrating heat meltable inks in a molten state into pores of the porous ink-receiving layer. See, ITE (The Institute of Image Information and Television Engineers) Technical Report, Vol. 17, No. 27 (May, 1993), pages 19–24.

Furthermore, as methods for forming a porous layer, the following methods are known:

- a wet coagulation method, wherein a sheet coated with a solution of a resin in dimethylformamide is dipped into water and the dimethylformamide is replaced with water to form a porous layer (JP, B, 49-25430 and JP, A, 5-155163);
- a mechanical agitation foaming method, wherein after a resin is foamed by mechanical agitation and the foamed resin is applied onto a sheet to form a porous layer (JP, A, 7-32753 and JP, A, 7-309074);
- a pigment addition method, wherein a porous layer of a resin is formed by utilizing the oil absorbing property of a porous pigment incorporated in the resin (JP, A, 3-98333 and Japanese Patent No. 2,535,371);
- a solvent dissolving method or a dry method, wherein a resin is dissolved into a mixture of a good solvent having a lower boiling point and a poor solvent having a higher boiling point, the resulting solution is applied onto a sheet and then dried to form a porous layer having a porous structure composed of pores resulting from the poor solvent with a slower rate of drying (JP, A, 4-82790, and JP, A, 6-166283);
- a foaming agent method, wherein a porous layer of a resin is formed by incorporating into the resin a foaming agent that generates a gas upon heating, and then foaming the resin (JP, A, 2-3396); and
- a soluble particles-dissolving-off method, wherein a resin containing soluble particles is formed into a film and the soluble particles contained in the film are off by washing to form a porous layer (JP, A, 6-171250).

However, in all the above-described porous layer forming methods, it is difficult to control the state of a porous structure, which is recognized to be the most important factor in a thermal transfer involving penetrating ink into pores of the porous ink-receiving layer. As a result, when the number of minute pores in the receiving layer is small, not enough penetration is achieved, and when the pore size is large, an adverse effect results upon the transfer of minute dots.

Among the above-described porous layer forming methods, the wet coagulation method is the one that can relatively easily form a large number of minute pores in the ink-receiving layer. In the wet coagulation method, various types of methods have been examined. Particularly, methods of incorporating a filler component into a resin component to improve a film strength are reported in JP, B, 49-25430 (a wet coagulation method using a mixture of a styrene resin, a plasticizer and a filler), and JP, B, 5-18332 (a wet coagulation method using a mixture of a polyester resin, a plasticizer and a filler). However, in the porous layers formed by these methods, the pore size in the porous layer is large and the porous structure is in a coarse state. Consequently, in thermal transfer printing, it is difficult to form dots of uniform shape because of an insufficient ink penetration. Especially in the case of printing a full-color image, a transfer failure of a second color or subsequent colors to be superimposed on the first color occurs, and hence it is difficult to form a high-definition image.

The present inventors have evaluated various porous sheets prepared according to known technologies as porous image-receiving sheets. The characteristics of porous sheets prepared by the mechanical agitation foaming method and the wet coagulation method, which are considered to be extensively improved in the formation of a high-quality image as compared to conventional image-receiving sheets, are summed as follows:

In the case of an image-receiving sheet having a porous ink-receiving layer formed by the mechanical agitation foaming method, a water-based coating can be used and an image-receiving sheet can be produced by the drying process only after the coating process. Therefore, it is possible to use a paper sheet as a substrate. This is advantageous because a wide selection of substrates for the image-receiving sheet can be used. On the other hand, the obtained porous ink-receiving layer has a wide variation of open pore diameter and a high proportion of pores with large diameter. As a result, there are the following disadvantages: It is difficult to obtain sharp dots. Grainy appearance of small dots is conspicuous in a highlight region. A maximum density (saturated density) of a high level is difficult to be obtained. The gloss of the image obtained is poor.

On the other hand, in the case of an image-receiving sheet having a porous ink-receiving layer formed by the wet coagulation method, pure paper cannot be used as a substrate because of its manufacturing process and high cost. From the viewpoint of formation of a high-definition image, however, the porous ink-receiving layer has a narrow variation of open pore diameter and a low proportion of pores with large diameter as compared with the porous ink-receiving sheet prepared by the mechanical agitation foaming method, resulting in sharply improved performances. However, in order to obtain an image quality comparable to or superior to the image quality achieved by a sublimation transfer method, it must be improved still more. Furthermore, the present inventors have evaluated the superimposing performance of a second color and subsequent colors by using an image-receiving sheet having a porous ink-receiving layer formed by the wet coagulation method disclosed in JP, A, 62-197183 in the image forming method disclosed in JP, A, 6-286181. The results show a defect in that a lot of ink flows and dot lacks are observed, especially in a region from intermediate tone to shadow tone in the resulting image. In order to obtain a high-definition color image, not only the performance of a first color but also the superimposing performance of a second color or subsequent colors is important. However, in the prior art, there are no disclosures mentioning this, as far as the present inventors know.

The water vapor permeability of an ink image-receiving sheet is described in Japanese Patent No. 2,966,901. However, this patent mentions only that the writing property with writing devices, such as a pencil and various pens, is improved by limiting the thickness of the porous ink-receiving layer to a range of 3 to 50 μm and a water vapor permeability to a range of 1,000 to 9,000 g/(m$^2$·hour). Moreover, the patent does not mention the production of an image-receiving sheet, which is used in an image formation method using a heat-meltable ink, the transfer of which is performed by melting the heat-meltable ink with heat provided from a printer head in thermal transfer to penetrate the ink into a porous structure of the receiving sheet, and which is superior in dot shape reproducibility and gradation reproducibility including variable printing performance, and color clearness, especially, dot reproducibility of second color and subsequent color in a color image, which is the object of the present invention.

Furthermore, although the patent mentions the improvement in the writing property with writing devices, such as a pencil and a pen, there is no description of the hardness of the pencil used. The inventors have performed experiments based on this patent. With respect to the writing property with a pencil on an ink-receiving layer formed according to the patent, the experiments confirm good writing property in a writing using pencils having relatively low hardness from 2B to 6B. However, when writing was performed using pencils having a relatively high hardness of HB or harder, the surface of the ink-receiving layer was scraped off or depressed by the pencil. This is because the hardness of the ink-receiving layer was insufficient as a result of the high water vapor permeability layer of the porous layer, which constitutes the ink-receiving layer (i.e., a high content of pores in the layer). Thus, it was recognized that the ink-receiving layer had insufficient writing property. With respect to the writing property of a water-based ball pen or an oil-based ball pen, a good result was obtained in the beginning of writing. However, a drawback is that bleeding of written characters, caused by diffusion of ink over time, tends to occur because of the existence of open pores in the porous layer. Moreover, when an image was formed using an image-receiving sheet having a porous ink-receiving layer with a water vapor permeability prescribed in the patent and a heat meltable ink which can be transferred by penetration, the ink-receiving layer itself could not be restored to its original state after being pressed with a thermal transfer printer head in printing because the strength of the ink-receiving layer itself was low. Consequently, especially in the case of printing a second color or subsequent color, when a thermal transfer sheet for a second color or subsequent color was pressed against the ink-receiving layer with the thermal transfer printer head from the back side of the thermal transfer sheet, the thermal transfer sheet could not be brought into close contact with the ink-receiving layer and the heat-meltable ink was not sufficiently melted. As a result, it was difficult to form uniform dots, especially in a low density region. Furthermore, since the adhesion force of the porous ink-receiving layer to a substrate was poor, some disadvantages were observed, for example, the ink-receiving layer was removed from the substrate by weak frictional force.

In view of the foregoing, an object of the present invention is to provide an ink image-receiving sheet used in a melting type thermal transfer recording method which has excellent ink-receiving property and writing property, and is capable of forming a high-definition, high-quality recorded image excellent in dot reproducibility and gradation reproducibility especially in a full-color printing.

Another object of the present invention is to provide a method for forming an image using the foregoing ink image-receiving sheet which is capable of forming an image excellent in dot reproducibility and gradation reproducibility, especially excellent in dot reproducibility of a second color or subsequent color in color image formation.

These and other objects of the present invention will become apparent from the description hereinafter.

SUMMARY OF THE INVENTION

The present invention provides the following ink image-receiving sheet and image forming method:

(1) A heat meltable ink image-receiving sheet used in an image forming method, comprising the steps of: bringing a thermal transfer sheet with a heat meltable ink on a substrate into contact with an image-receiving sheet to face the ink side of the thermal transfer sheet, and melting the ink with heat from a printing head of a thermal transfer printer from the back side of the thermal transfer sheet to transfer the ink onto a surface of the image-receiving sheet, thereby forming an image, the heat meltable ink image-receiving sheet comprising a sheet substrate and a porous ink-receiving layer comprising a resin formed on at least one side of the sheet substrate, the porous ink-receiving layer having a thickness of 3 to 50 μm and a water vapor permeability (JIS L 1099) of not less than 300 g/(m$^2$·hour) and less than 1,000 g/(m$^2$·hour).

(2) The heat meltable ink-receiving sheet according to (1) above, wherein the resin of the porous ink-receiving layer comprises a polyurethane resin.

(3) The heat meltable ink-receiving sheet according to (2) above, wherein the polyurethane resin has a softening point of not less than 100° C.

(4) The heat meltable ink-receiving sheet according to any of (2) or (3) above, wherein the porous ink-receiving layer further comprises a particulate component with an oil absorption of not less than 50 ml/100 g (JIS K 5101), and a weight ratio of the polyurethane resin and the particulate component in a range of 70:30 to 35:65.

(5) The heat meltable ink-receiving sheet according to (4) above, wherein the particulate component is a light calcium carbonate.

(6) The heat meltable ink image-receiving sheet according to any of (1) to (5) above, wherein the sheet substrate comprises a plastic material or a paper material.

(7) The heat meltable ink image-receiving sheet according to any of (1) to (6) above, wherein the porous ink-receiving layer is a layer with a porous structure formed by a wet coagulation method.

(8) A method for forming an image comprising the steps of:

providing a heat meltable ink image-receiving sheet comprising a sheet substrate and a porous ink-receiving layer comprising a resin formed on at least one side of the sheet substrate, the porous ink-receiving layer having a thickness of 3 to 50 μm and a water vapor permeability (JIS L 1099) of not less than 300 g/(m$^2$·hour) and less than 1,000 g/(m$^2$·hour), bringing a thermal transfer sheet with a heat meltable ink on a substrate into contact with the ink-receiving layer of the image-receiving sheet to face the ink side of the thermal transfer sheet, and melting the ink with heat from a printing head of a thermal transfer printer from the back side of the thermal transfer sheet to penetrate the ink into the pores of the ink-receiving layer, thereby forming an image.

DETAILED DESCRIPTION

By using the heat-meltable ink image-receiving sheet of the present invention in an image formation method, wherein a heat-meltable ink is penetrated into the pores of an image-receiving sheet having a porous layer, as reported in the above-described ITE (The Institute of Image Information and Television Engineers) Technical Report, Vol. 17, No. 27 (May, 1993), pages 19–24, etc., it is possible to form an image having excellent gradation reproducibility and dot reproducibility, including variable printing performance, and color clearness.

A degree of penetration of a heat meltable ink into the pores of the porous ink-receiving layer is determined by (1) the diameter of the pore opening in the surface of the ink-receiving layer; (2) the ratio of the total area of all pore openings to the whole surface area of the ink-receiving layer; and (3) the ratio of the number of open pores to the total number of pores contained in the ink-receiving layer. These items can be easily evaluated by measuring the water vapor permeability (JIS L 1099) of the porous ink-receiving layer itself.

In the present invention, an ink image-receiving sheet having a porous ink-receiving layer that has a thickness of 3 to 50 $\mu$m and a water vapor permeability of not less than 300 g/(m$^2$·hour) and less than 1,000 g/(m$^2$·hour) is used. A heat meltable ink is melted with heat provided by a thermal transfer printer head and penetrated into the porous structure of the ink image-receiving sheet. In this method, the ink can be sufficiently penetrated into the porous structure, even when printing a second color or subsequent color. In addition, a jump-up of density in the vicinity of a saturated density is not observed in a high density region and a reproduction of a uniform minute dots can be performed even in a low density region. As a result, the present invention provides an image with a rich gradation representation and a high definition that could not be produced by the conventional area gradation method.

Furthermore, in a preferred embodiment of the present invention, a particulate component with an oil absorption of not less than 50 ml/100 g (JIS K 5101) is blended with a resin component as a constituent of the porous ink-receiving layer to improve its layer strength and increase its oil absorption capacity. As a result, the writing property with writing devices, such as a pencil, a water-based ball pen or an oil-based ball pen, is improved.

The ink image-receiving sheet of the present invention is composed of a sheet substrate and a porous ink-receiving layer comprising a resin formed on at least one side of the sheet substrate. The thickness of the porous ink-receiving layer is 3 to 50 $\mu$m. The water vapor permeability (JIS L 1099) of the porous ink-receiving sheet is not less than 300 g/(m$^2$·hour) and less than 1,000 g/(m$^2$·hour), and preferably from 300 g/(m$^2$·hour) to 900 g/(m$^2$·hour). If the water vapor permeability is lower than the foregoing range, a heat meltable ink cannot be sufficiently penetrated into the pores of the porous ink-receiving layer, resulting in degraded gradation reproducibility and dot reproducibility including variable printing performance, and substantially degraded dot reproducibility and color clearness of a second color and subsequent color in forming a color image. When the water vapor permeability is higher than the foregoing range, the ink-receiving layer itself cannot be restored to its original state after being pressed in printing with a thermal transfer printer head because the strength of the ink-receiving layer itself is low. Consequently, especially in the case of printing a second color or subsequent color, when a thermal transfer sheet for a second color or subsequent color is pressed against the ink-receiving layer with a thermal transfer printer head from the back side of the thermal transfer sheet, the thermal transfer sheet cannot be brought into close contact with the ink-receiving layer and the heat meltable ink is not sufficiently melted. As a result, it is difficult to form uniform dots, especially in a low density region. Furthermore, since the adhesion force of the porous ink-receiving layer to the substrate is poor, the ink-receiving layer is removed from the substrate by a weak frictional force. If the thickness of the porous ink-receiving layer is smaller than the foregoing range, since the amount of the heat-meltable ink penetrated into the porous ink-receiving layer is small, a degradation tends to be observed in gradation reproducibility and dot reproducibility, including variable printing performance, and especially in dot reproducibility of a second color or subsequent color and color clearness in forming color image. Moreover, if the thickness of the porous ink-receiving layer is larger than the foregoing range, the writing property tends to be degraded due to its excessive elasticity.

The term "voidage" as a physical property shows the characteristics of a porous layer, but a voidage value does not reflect the above-described factors; (1) the diameter of the pore opening in the surface of the ink-receiving layer; (2) the ratio of the total area of all pore openings to the whole surface area of the ink-receiving layer; and (3) the ratio of the number of open pores to the total number of pores contained in the ink-receiving layer, which determine a degree of penetration of the heat meltable ink into the pores of the porous ink-receiving layer. In the present invention, the water vapor permeability is used as a physical property reflecting factors (1), (2) and (3). The limitation of the water vapor permeability to the above-described range enables the formation of an image with excellent gradation reproducibility and dot reproducibility, including variable printing performance, and color clearness in an image forming method wherein the heat meltable ink is penetrated into the pores of the image-receiving sheet having the porous layer.

In the present invention, the porous ink-receiving layer can be formed by general methods for forming a porous layer. However, a wet coagulation method and a porous layer forming method using a water-in-oil type polyurethane emulsion are preferred. A wet coagulation method is especially preferred, because it is easy to form pores along the thickness direction of the ink-receiving layer, and when the penetration transfer of a heat meltable ink into the resultant image-receiving sheet is performed, uniform dots are easily reproduced (namely, the molten ink does hardly diffuse in the planar direction of the ink-receiving layer).

In the wet coagulation method, a coating liquid for ink-receiving layer in which a resin is dissolved in an organic solvent is applied onto a substrate, and then the coated substrate is introduced into a bath containing a treating liquid that is compatible or miscible with the aforesaid organic solvent and does not dissolve the aforesaid resin. Since the organic solvent in the receiving layer coating liquid is highly compatible with the treating liquid in the bath, they are replaced mutually, i.e., the organic solvent in the coated layer flows out into the bath, and at the same time the treating liquid of the bath penetrates into the coated layer. Consequently, the resin in the coated layer is coagulated because it is insoluble in the treating liquid. Thereby the portions in the coated layer from which the organic solvent has flowed out becomes pores to form a porous layer (refer to JP, B, 49-25430 and JP, A, 5-155163). In a receiving layer coating liquid, minute particles may be added as a third component as shown in JP, B, 49-25430 and JP, B, 5-18332.

Moreover, two or more kinds of resins with mutually low miscibility may be used in combination as a resin component as shown in JP, B, 5-87311.

In the porous layer forming method using a water-in-oil type polyurethane emulsion, a water-in-oil type polyurethane emulsion wherein a suitable amount of water is emulsified into a polyurethane solution is prepared by dissolving and/or dispersing a polyurethane resin into an organic solvent with a low boiling point, applied onto a substrate and dried. In the drying process, pores are formed in the portions where the water with a slower drying rate has remained, giving a porous layer (refer to JP, A, 4-82790 and JP, A, 6-166283).

In the present invention, it is preferable that the pores contained in the porous ink-receiving layer are open pores because the image is formed by penetration-transfer of a heat meltable ink into the pores of the porous ink-receiving layer. Furthermore, the thickness of the porous ink-receiving layer is preferably within the range of 3 to 50 μm in order to have pores that can contain the whole quantity of the transferred ink. In practice, when transfer is performed using four thermal transfer sheets having different color heat meltable ink layers of yellow, magenta, cyan and black and each ink layer has a thickness of 2 μm, it is preferable that the thickness of the porous ink-receiving layer having a voidage of 50% is 16 μm or more. Herein, voidage means a ratio of the total volume occupied by voids in the formed porous layer and is determined by the following equation:

$$\text{Voidage } (\%) = (1 - w/dh) \times 100$$

wherein w: the weight of a porous layer (g/m$^2$)

d: the true specific gravity of a porous layer (g/cm$^3$)

h: the thickness of a porous layer (μm)

In the case of the wet coagulation method, the receiving layer coating liquid used in the present invention is composed of a resin component and a solvent. The resin component is preferably composed of a polyurethane resin as a main component. In the case of a method using a water-in-oil type polyurethane emulsion, the receiving layer coating liquid is composed of an oil phase comprising of a polyurethane resin and an organic solvent, and an aqueous phase comprising water as a main component and a surface active agent if required.

Examples of polyurethane resins which can be used in the present invention are polyester based polyurethanes, polyether based polyurethane, polyamide based polyurethanes and polycarbonate based polyurethanes. It is preferable to use polyester based polyurethanes in a wet coagulation method. It is preferable to use polyether based polyurethanes in a water-in-oil polyurethane emulsion method.

The porous layer is preferably composed of a resin component as a main component, preferably a polyurethane resin as a main component, having a softening point greater than the softening point of a heat meltable ink, typically a softening point of not less than 100° C., by which the penetration of the heat meltable ink into the porous layer is secured even when transferring a second color or subsequent color. When the softening point of the resin component is less than 100° C., there is a possibility that the porous structure is fractured upon thermal transfer of the heat meltable ink. As a result, the ink penetration of a second color or subsequent color is hindered, resulting in the failure to form an image formation with high quality.

Furthermore, in the present invention, a particulate component may be incorporated in the ink-receiving layer. By incorporating a particulate component in the ink-receiving layer, minute pores can be stably formed when forming a porous structure, and a dot thickening, resulting from the spreading of a heat meltable ink in the plane direction, can be prevented in a penetration transfer of the heat meltable ink. Furthermore, the incorporation of the particulate component increases the strength of the receiving layer and reduces the coefficient of friction on the surface of the receiving layer, resulting in an improvement of a conveyance property of the image-receiving sheet within a printer. Moreover, due to the strength of the receiving layer increased by the incorporation of the particulate component, a writing property with writing devices, especially pencils with a relatively high hardness, for example, a usually used hardness ranging from HB to H, is improved. In addition, the ink of a water-based ball pen, an oil-based ball pen or the like can be absorbed more quickly to more satisfactorily prevent bleeding of written characters by using a particulate component having an oil absorption of not less than 50 ml/100 g (JIS K 5101).

Moreover, the weight ratio of the resin component and the particulate component is preferably in the range of 70:30 to 35:65. If the proportion of the resin component is more than this range, a favorable effect of the particulate component on formation of a porous structure, especially on formation of pores in a surface layer of an ink-receiving layer, tends to become inadequate, such that the penetration of the heat meltable ink becomes difficult and the dot shape becomes non-uniform in printing with the heat meltable ink. If the proportion of the particulate component is more than this range, the surface strength of the receiving layer tends to decrease, such that particles drop out even with a weak frictional force, causing degradation in the writing property.

As the particulate component, a light calcium carbonate, particularly an aragonite type light calcium carbonate, is preferable. It is preferable that the particulate component is ground until its agglomeration structure is broken and uniformly dispersed in a resin component, particularly a polyurethane resin. The particulate component dispersed preferably has an average particle size of not more than 2.5 μm, more preferably not more than 1.5 μm. In the case where the agglomeration structure is not fully broken, a secondary agglomeration appears on the receiving layer surface formed and a satisfactory surface smoothness is not obtained. Consequently, uniform dots cannot be formed and a grainy appearance occurs in a highlight region due to dropout portions in minute dots and lack of minute dots. Thus, it is difficult to form a high-definition image.

As substrates for the image-receiving sheet, commonly used plastic films or sheets, white films or sheets in which a white pigment or the like is incorporated in plastic material, foamed plastic films or sheets, and paper sheets having water resistance, such as synthetic paper sheets or laminated paper sheets, can be used. Moreover, when a porous layer is formed using a water-in-oil type polyurethane emulsion, non-coated paper sheets, such as high-quality paper sheets and PPC paper sheets, and coated paper sheets, such as art paper sheet, can be used in addition to the foregoing substrates having water resistance. Furthermore, a primer layer, an antistatic treatment or a corona treatment may be applied onto the foregoing substrates to improve the adhesion to an ink-receiving layer. In addition, a lubricating layer or an antistatic layer may be applied onto the back side of the substrate and/or onto an ink-receiving layer if required.

In the present invention, a receiving layer coating liquid may be applied using various known methods, such as a reverse roll coating method, an air knife coating method, a gravure coating method, a blade coating method, a comma coating method and a rod coating method.

Next, the thermal transfer sheet used in the image formation method of the present invention will be explained. In the present invention, a thermal transfer sheet that has on a support a heat meltable colored ink layer composed of a wax as a main component, which ink layer can be melted with heat provided by a printer head and penetrated into the porous structure of the ink-receiving layer of the aforesaid image-receiving sheet, can be used. Colored ink layers of a plurality of colors, for example, yellow, magenta and cyan, and optionally black, are used for the formation of a multi- or full-color image. Colored ink layers of a plurality of colors may be sequentially arranged in a side-by-side relation on a single support, or the respective colored ink layers may be provided on separate supports.

In the case of forming a multi- or full-color image according to the image formation method of the present invention, for example, colored inks of a first color, a second color, a third color and if required further subsequent colors (fourth color, and so on) are subsequently penetrated into the pores of an ink-receiving layer of an image-receiving sheet to form a multi- or full-color image including regions developing a color resulting from superimposed inks in the pores. Herein, a color transferred first on the image-receiving sheet is referred to as a first color; a color transferred second as a second color; a color transferred third as a third color; and a color transferred fourth as a fourth color; and so on. Typically, the first color, the second color and the third color are selected from yellow, magenta and cyan which are primary colors for subtractive color mixture, and if necessary, black is used as the fourth color.

In the image formation method of the present invention, after an image is formed on an image-receiving sheet, a transparent overcoat layer may be thermally transferred onto the foregoing image if necessary, to impart a gloss to the image and/or to protect the image surface. This overcoat layer may be sequentially arranged with the colored ink layers on the same support of the thermal transfer sheet or may be provided on a support which is independent of the thermal transfer sheet.

The present invention will be described in more detail by way of Examples. It is to be understood that the present invention will not be limited to the Examples, and various changes and modifications may be made in the invention without departing from the spirit and scope thereof. The term "part" in Examples and Comparative Examples represents "part by weight".

Manufacturing of Image-Receiving Sheet

EXAMPLE 1

A liquid composition with the following Composition-1 underwent a grinding/dispersing treatment so that the light calcium carbonate had an average particle size of 1.0 $\mu$m, thereby yielding a receiving layer coating liquid. The receiving layer coating liquid was applied onto one side of a polyethylene terephthalate film having a thickness of 100 $\mu$m. The resulting coated film was dipped in water at 20° C. for 60 seconds and then in hot water at 80° C. for 10 seconds. After the moisture of the coated film was fully removed, the coated film was dried for one minute in a hot air dryer at 85° C. to form a porous ink-receiving layer with a thickness of 15.0 $\mu$m and a voidage of 61%.

Composition-1

| Component | Part |
|---|---|
| Polyester based polyurethane resin (softening point: 215° C., 100% modulus: 4.4 MPa) | 60.0 |
| Polyester based polyurethane resin (softening point: 215° C., 100% modulus: 10.6 MPa) | 40.0 |
| Light calcium carbonate (oil absorption: 60 ml/100 g) | 30.0 |
| N,N-dimethylformamide | 150.0 |
| Hydrophilic surface active agent | 3.0 |

Comparative Example 1

A coating liquid with the following Composition-2 was applied onto one side of a polyethylene terephthalate film having a thickness of 100 $\mu$m. The resulting coated film was dipped into water at 20° C. for 60 seconds and then in hot water at 90° C. for 5 seconds. After the moisture of the coated film was fully removed, the coated film was dried for one minute in a hot air dryer at 50° C. to form a porous ink-receiving layer having a thickness of 18.0 $\mu$m and a voidage of 39%.

Composition-2

| Component | Part |
|---|---|
| Polyether based polyurethane resin (softening point: 120° C., 100% modulus: 12.4 MPa) | 160.0 |
| N,N-dimethylformamide | 640.0 |

EXAMPLE 2

A coating liquid with the following Composition-3 (water-in-oil type polyurethane emulsion) was applied onto one side of a polyethylene terephthalate film having a thickness of 100 $\mu$m. The resulting coated film was dried for 120 seconds in an oven at 80° C. and then for 120 seconds in an oven 130° C. to form a porous ink-receiving layer having a thickness of 21 $\mu$m and a voidage of 46%.

The water-in-oil type polyurethane emulsion was prepared as follows. A polyether based polyurethane resin was dissolved into a mixed solvent of methyl ethyl ketone/toluene to prepare a polyurethane solution (liquid A). Next, an isocyanate was dispersed in water to prepare an isocyanate dispersion (liquid B). Liquid B was added in five portions into the liquid A with stirring at 1,200 rpm to obtain a water-in-oil type polyurethane emulsion.

Composition-3

| Component | Part |
|---|---|
| Liquid A | |
| Polyether based polyurethane resin (softening point: 170° C., 100% modulus: 3.5 MPa) | 100.0 |
| Methyl ethyl ketone | 100.0 |
| Toluene | 20.0 |
| Liquid B | |
| Water | 50.0 |
| Isocyanate | 2.0 |

Comparative Example 2

A coating liquid with the following Composition-4 (water-in-oil type polyurethane emulsion) was applied onto one side of a polyethylene terephthalate film having a thickness of 100 μm. The resulting coated film was dried for 120 seconds in an oven at 60° C. and then for 120 seconds in an oven at 125°, and aged at 40° C. for one week to form a porous ink-receiving layer having a thickness of 15 μm and a voidage of 83%.

The water-in-oil type polyurethane emulsion was prepared as follows. A polyether based polyurethane resin was dissolved into methyl ethyl ketone to prepare a polyurethane solution (liquid C). Next, an isocyanate solution was prepared by mixing a 50% by weight isocyanate solution in methyl ethyl ketone with a mixed solvent of methyl ethyl ketone/toluene. Water was emulsified into the isocyanate solution in the presence of an emulsifier to prepare an emulsion (liquid D). Liquid D was added into liquid C with stirring at 1,200 rpm to obtain a water-in-oil type polyurethane emulsion.

Composition-4

| Component | Part |
|---|---|
| Liquid C | |
| Polyether based polyurethane resin (softening point: 170° C., 100% modulus: 3.5 MPa) | 30.0 |
| Methyl ethyl ketone | 70.0 |
| Liquid D | |
| Methyl ethyl ketone | 30.0 |
| Toluene | 30.0 |
| 50% by weight isocyanate solution in methyl ethyl ketone | 10.0 |
| Emulsifier | 5.0 |
| Water | 60.0 |

Manufacturing of thermal transfer sheet

To form a colored ink layer having a thickness of 2.0 μm, each of the colored inks shown below was applied by a hot melt coating method onto one side of a 4.5 μm-thick polyethylene terephthalate film having a 0.1 μm-thick sticking-prevention layer composed of a modified silicone resin on the other side. Thus, four thermal transfer sheets in yellow, magenta, cyan and black were obtained.

Yellow ink

| Component | Part |
|---|---|
| Yellow pigment (C. I. P. Y. 14) | 15.0 |
| Paraffin wax | 60.0 |
| Carnauba wax | 20.0 |
| Ethylene-vinyl acetate copolymer | 5.0 |

Magenta ink

| Component | Part |
|---|---|
| Magenta pigment (C. I. P. R. 57:1) | 15.0 |
| Paraffin wax | 60.0 |
| Carnauba wax | 20.0 |
| Ethylene-vinyl acetate copolymer | 5.0 |

Cyan ink

| Component | Part |
|---|---|
| Cyan pigment (C. I. P. B. 15:3) | 15.0 |
| Paraffin wax | 60.0 |
| Carnauba wax | 20.0 |
| Ethylene-vinyl acetate copolymer | 5.0 |

Black ink

| Component | Part |
|---|---|
| Carbon black | 15.0 |
| Paraffin wax | 60.0 |
| Carnauba wax | 20.0 |
| Ethylene-vinyl acetate copolymer | 5.0 |

Evaluation Method (1) Water Vapor Permeability

Each porous ink-receiving layer formed in the aforesaid Examples 1 and 2 and Comparative Examples 1 and 2 was carefully removed so that the porous layer was not broken. According to the A-1 method (calcium chloride method) described in JIS L 1099, the water vapor permeability was determined based on an increase in weight of the calcium chloride after one hour. The results are shown in Table 1.

(2) Writing Property (2-1) Pencil Writing Property

Letters were written on the surface of each porous ink-receiving layer formed in the aforesaid Examples 1 and 2 and Comparative Examples 1 and 2, using a pencil with hardness of HB, and the degree of the surface damage of the receiving layer was evaluated according to the following criteria. The results are shown in Table 1. In practice, an acceptable level is Grade 3 or more.

5: The written part suffers no damage.
4: The surface of the written part is a little depressed.
3: The surface of the written part is depressed.
2: A portion of the surface of the written part is scraped off to such a degree that reading the letters is difficult.
1: The surface of the written part is scraped off to such a degree that reading the letters is impossible.

(2-2) Writing Property with water-based ball pen or oil-based ball pen

Letters were written on the surface of each porous ink-receiving layer formed in the aforesaid Examples 1 and 2 and Comparative Examples 1 and 2, using a water-based ball pen or an oil- based ball pen, and the bleeding of the written letters was evaluated according to the following criteria. The results are shown in Table 1. In practice, an acceptable level is Grade 3 or more.

5: No bleeding occurs in the letters of the written part.
4: A little bleeding occurs in the letters of the written part.
3: A little thickening of the line occurs in letters of the written part due to the bleeding of ink.
2: Thickening of the line occurs in the letters of the written part due to the bleeding of ink to such a degree that reading the letters is difficult.
1: Reading the letters in the written part is impossible due to the bleeding of the ink.

(3) Minimum Dot Diameter, Minimum Dot Shape and Number of Gradations in Density Gradation Representation A 256-gradation pattern was printed with black color by means of a variable dot type thermal transfer color printer (dot density: 300 dpi, maximum printing energy: 0.12 mJ/dot, printing speed: 10 msec/line) using each ink image-receiving sheet and black color thermal transfer sheet obtained above. A minimum dot diameter and a minimum dot shape and a number of gradations in density gradation representation were determined as described below. The results are shown in Table 1.

(3-1) Minimum Dot Diameter

Printing was performed using the aforesaid printer by changing a printing energy in 256 levels to form an image, and the diameter of a colored ink dot (the length of the long side) that could be transferred with a minimum energy among the printed dots in the image was measured by a microscope.

(3-2) Minimum Dot Shape

Printing was performed in the same manner as in (3-1) above to form an image. The shape of a colored ink dot that could be transferred with minimum energy among the printed dots in the image was observed by a microscope and evaluated according to the following criteria. In practice, an acceptable level is Grade 4 or more.

5: Dots in the same optical density region are reproduced in uniform shape without any dropout portion or void.
4: Dots in the same optical density region are reproduced in an almost uniform shape, although a dropout portion or void occurs in some of the dots.
3: A dropout portion or void in dot and dot lack occur in some of the dots in the same optical density region.
2: A dropout portion or void in dot and dot lack occur in a lot of the dots in the same optical density region.
1: A dropout portion or,void in dot and dot lack occur in dots in the same optical density region to such a degree that a grainy appearance is conspicuous as an image.

(3-3) Number of Gradations in Density Gradation Representation

Printing was performed using the aforesaid printer by changing a printing energy in 256 levels wherein an energy difference between adjacent energy levels was set constant to form respective images corresponding to the energy levels. The number of energy levels giving images between which a significant difference in reflective optical density (OD value) was observed, i.e., number of gradations, were determined. In practice, an acceptable level is Grade 4 or more.

5: 96 gradations or more
4: 64 to 95 gradations
3: 32 to 63 gradations
2: 16 to 31 gradations
1: 15 gradations or less (4) Ink Penetration Using the aforesaid printer, a solid printing was successively performed with yellow ink (first color ink), magenta ink (second color ink) and cyan ink (third color ink) in this order on each image-receiving sheet, and then a 256-gradation pattern was printed with black ink (fourth color ink). A deformation degree of dot shape of black dots in the printed image was observed by a microscope and the penetration of inks into the ink-receiving layer was evaluated according to the following criteria. In practice, an acceptable level is Grade 4 or more.

5: Dots of the first color ink to the fourth color ink have a uniform shape.
4: Dots of the first color ink to the third color ink have a uniform shape and only a part of the fourth color ink is not penetrated into the pores and is flowed out of the pores.
3: Dots of the first color ink to the third color ink have a uniform shape and only the fourth color ink is not penetrated into the pores and flowed out of the pores.
2: Dots of the first color ink and the second color ink have a uniform shape and a part of the third color ink and the fourth color ink are not penetrated into the pores and flowed out of the pores.
1: Dots of the first color ink and the second color ink have a uniform shape and the third color ink and fourth color ink are not penetrated into the pores and flowed out of the pores.

TABLE 1

| | Production method | Water vapor permeability ($m^2 \cdot$ hour) | Minimum dot Diameter ($\mu$m) | Minimum dot Shape | Number of gradations | Ink penetration | Writing property HB pencil | Writing property Water based ball pen | Writing property Oil based ball pen |
|---|---|---|---|---|---|---|---|---|---|
| Ex. 1 | Wet coagulation method | 730 | 15 | 5 | 5 | 5 | 5 | 4 | 4 |
| Ex. 2 | Emulsion method | 380 | 20 | 5 | 4 | 4 | 4 | 3 | 4 |
| Com. Ex. 1 | Wet coagulation method | 250 | 20 | 2 | 2 | 2 | 4 | 3 | 4 |
| Com. Ex. 2 | Emulsion method | Note | 50 | 2 | 1 | 5 | 2 | 2 | 2 |

Note:
Measurement of water vapor permeability was impossible because the porous layer was broken when it was removed from the substrate.

With respect to the ink penetration, the same good results as in Examples 1 and 2 were obtained even when the yellow ink, magenta ink and cyan ink were transferred in an order other than that defined above (i.e., the transfer of the yellow ink, magenta ink and cyan ink in this order).

An image with excellent gradation reproducibility and dot reproducibility, including a variable printing performance and color cleanness can be formed by using the ink image-receiving sheet of the present invention. Furthermore, the ink image-receiving sheet of the present invention has excellent writing property with a pencil and a pen.

What is claimed is:

1. A heat meltable ink image-receiving sheet used in an image forming method comprising the steps of: bringing a thermal transfer sheet with a heat meltable ink on a substrate into contact with an image-receiving sheet to face the ink side of the thermal transfer sheet, and melting the ink with heat given by a printing head of a thermal transfer printer from the back side of the thermal transfer sheet to transfer the ink onto the image-receiving sheet, thereby forming an image, the heat meltable ink image-receiving sheet, comprising a sheet substrate and a porous ink-receiving layer, comprising a resin formed on at least one side of the sheet substrate, the porous ink-receiving layer having a thickness of 3 to 50 $\mu$m and a water vapor permeability (JIS L 1099) of not less than 300 g/($m^2$·hour) and less than 1,000 g/($m^2$·hour).

2. The heat meltable ink-receiving sheet according to claim 1, wherein the resin of the porous ink-receiving layer comprises a polyurethane resin.

3. The heat meltable ink-receiving sheet according to claim 2, wherein the polyurethane resin has a softening point of not less than 100° C.

4. The heat meltable ink-receiving sheet according to claim 2, wherein the porous ink-receiving layer further comprises a particulate component with an oil absorption of not less than 50 ml/100 g (JIS K 5101), and a weight ratio of the polyurethane resin and the particulate component is in a range of 70:30 to 35:65.

5. The heat meltable ink-receiving sheet according to claim 4, wherein the particulate component is a light calcium carbonate.

6. The heat meltable ink image-receiving sheet according to claim 1, wherein the sheet substrate comprises a plastic material or a paper material.

7. The heat meltable ink image-receiving sheet according to claim 1, wherein the porous ink-receiving layer is a layer with a porous structure formed by a wet coagulation method.

8. A method for forming an image comprising the steps of:

providing a heat meltable ink image-receiving sheet comprising a sheet substrate and a porous ink-receiving layer comprising a resin formed on at least one side of the sheet substrate, the porous ink-receiving layer having a thickness of 3 to 50 $\mu$m and a water vapor permeability (JIS L 1099) of not less than 300 g/($m^2$·hour) and less than 1,000 g/($m^2$·hour), bringing a thermal transfer sheet with a heat meltable ink on a substrate into contact with the ink-receiving layer of the image-receiving sheet to face the ink side of the thermal transfer sheet, and melting the ink with heat from a printing head of a thermal transfer printer from the back side of the thermal transfer sheet to penetrate the ink into pores of the ink-receiving layer, thereby forming an image.

* * * * *